United States Patent [19]

Routson

[11] 3,789,613

[45] Feb. 5, 1974

[54] COMPOSITION AND METHOD FOR DIMINISHING THE FLOW OF WATER INTO PERMEABLE STRATA

[75] Inventor: Willis G. Routson, Walnut Creek, Calif.

[73] Assignee: The Dow Chemical Company, Midland, Mich.

[22] Filed: Aug. 3, 1972

[21] Appl. No.: 277,764

Related U.S. Application Data

[63] Continuation-in-part of Ser. No. 44,609, June 8, 1970, Pat. No. 3,687,200.

[52] U.S. Cl. .................................. 61/1 R, 61/36 R
[51] Int. Cl. ............................................ E02b 3/00
[58] Field of Search .. 61/36 R, .5; 166/295; 106/33, 106/287 SS

[56] References Cited

UNITED STATES PATENTS

| | | | |
|---|---|---|---|
| 3,677,987 | 7/1972 | Pence | 61/36 R |
| 3,396,790 | 8/1968 | Eaton | 166/300 |
| 3,064,436 | 11/1962 | Loofbourow et al. | 61/.5 |

*Primary Examiner*—Mervin Stein
*Assistant Examiner*—Alex Grosz
*Attorney, Agent, or Firm*—J. R. Lochhead

[57] ABSTRACT

A method and composition for treating porous formations through which water is escaping from ponds, canals, etc., said method utilizing a stable colloidal dispersion of a water-soluble, synthetic organic polymeric polyelectrolyte and a water-insoluble inorganic solid.

10 Claims, No Drawings

COMPOSITION AND METHOD FOR DIMINISHING THE FLOW OF WATER INTO PERMEABLE STRATA

This Application is a Continuation-in-Part of my copending Application Ser. No. 44,609, filed June 8, 1970, now U.S. Pat. No. 3,687,200, and entitled "METHOD FOR CONTROLLING FLOW OF AQUEOUS FLUIDS IN SUBTERRANEAN FORMATIONS", said Application being herein incorporated by reference.

SUMMARY OF THE INVENTION

The present invention is directed to employing certain colloidal compositions for controlling the flow of aqueous fluids into permeable formations. More particularly, the invention involves methods employing compositions comprising aqueous dispersions of the reaction product of certain organic polymeric polyelectrolytes and a colloidal, water-insoluble, inorganic compound, and especially methods employing such compositions for treating porous formations.

More particularly, the invention is a method for plugging leaks in permeable zones of, for instance, dams, canals, ponds, settling basins, lakes and the like.

In plugging such permeable zones, the colloidal dispersion may be generated and placed in a position to be carried into the porous formation or channels by the natural flow of water through the leaking zone. In one method of operation, the colloidal dispersion composition is prepared in a solution of sufficiently high specific gravity so that the composition can be allowed to flow down the upstream face of the dam and thereby seek out and penetrate the zones wherein leakage is occurring. In another method, the colloidal dispersion composition is added directly to the body of water itself, wherein it is carried into the leaking zone with the escaping water.

The invention further comprises a stable colloidal dispersion of a water-soluble, synthetic organic polymeric polyelectrolyte and a water-insoluble inorganic solid suitable for controlling the mobility of aqueous fluids in permeable formations or zones.

DETAILED DESCRIPTION OF THE INVENTION

In their broadest scope, the compositions of the present invention are those aqueous dispersions wherein a stable colloidal dispersion of a water-insoluble inorganic solid is formed in an aqueous solution of a water-soluble, synthetic organic polymeric polyelectrolyte, wherein said polyelectrolyte would normally flocculate said inorganic solid if the dispersion thereof had not been formed in the presence of said polyelectrolyte and wherein the finished aqueous composition is characterized by a resistance factor greater than the resistance factor for an aqueous solution containing the same concencentration of polymeric polyelectrolyte without said inorganic solid. For a definition of resistance factor, see my aforementioned co-pending Application and, also, U.S. Pat. No. 3,399,725.

In general the organic polymeric polyelectrolytes employed in the compositions of the present invention are known flocculating agents for finely divided, water-insoluble, inorganic solids. Thus, it would be expected that the addition of a dilute solution of one of the organic polymeric polyelectrolytes to a colloidal dispersion of water-insoluble inorganic solids would result in the flocculation and agglomeration of said solids. Surprisingly, however, when a colloidal dispersion of one of the water-insoluble inorganic solids of the invention is formed in a suitable aqueous solution of one of said organic polymeric polyelectrolytes, flocculation and agglomeration do not occur, but instead a stable, aqueous dispersion composition is obtained. Depending upon the concentration and nature of the polymeric polyelectrolyte and of the particular colloidal inorganic solid employed, the aqueous dispersion compositions of the invention may vary in consistency from liquids somewhat more viscous than the polymer solutions used in their manufacture to thick slimes or pultaceous gels. In any case, however, the compositions are adapted to flow into porous subterranean formations with escaping water and, for such use, are characterized by resistance factors which are increased with respect to the polymer solutions from which the compositions are prepared. Preferred inorganic solids for use in the compositions of the invention include the sulfides of iron, copper, nickel, mercury, zinc, cadmium, cobalt, tin and lead and the hydroxides of aluminum, chromium, iron, cadmium, cobalt, manganese, nickel, copper, tin and zinc. Most preferred are the hydroxides of aluminum and zinc.

The exact physical nature of these so-called colloidal dispersions is not completely understood. There appears to be an interaction of the inorganic compound with the polymeric polyelectrolyte causing marked effects on the rheological properties of the finished dispersion.

The water-soluble, synthetic organic polymeric polyelectrolytes employed in the composition of this invention are in general known flocculating agents characterized as substantially linear, high-molecular-weight polymers having sufficient polar groups in or along the polymer chain to render the polymer water-soluble. In the present context, high molecular weight polymers are those having weights of at least about one million, and preferably over two million. In practice it is preferred to employ water-soluble polymers characterized by a viscosity of at least 4 centipoises, preferably at least 12 centipoises, for a 0.5 percent by weight solution of the polymer in distilled water at 25°C. Representative polymeric polyelectrolytes useful in the invention are water-soluble polymers of acrylamide, acrylic acid, sodium styrenesulfonate and the like, and copolymers of such monomers with each other or with other suitable monoethylenically unsaturated monomers such as ethylene, propylene, styrene, methacrylic acid, methacrylamide, vinyl alkanoic esters, vinyl chloride, maleic anhydride and the like. Other suitable polymeric polyelectrolytes are the polymers and copolymers of sodiosulfoalkyl acrylates and methacrylates, aminoalkyl acrylates and methacrylates and water-soluble salts of copolymers of maleic anhydride with a vinyl-aromatic compound. The preferred polymeric polyelectrolytes are high molecular weight polyacrylamides and hydrolyzed polyacrylamides.

In preparing the compositions of the invention any suitable method for generating the colloidal, water-insoluble, inorganic compound may be employed provided said compound is formed in an aqueous solution of the water-soluble organic polymeric polyelectrolyte. In one method of producing the water-insoluble inorganic compound, a double decomposition reaction is employed. For example, a soluble compound embodying a suitable anion, such as a sulfide or hydroxide ion, is dissolved in an aqueous solution of a polymeric polyelectrolyte and an aqueous solution of a salt of a metal precipitatible by said anion is added thereto gradually and with sufficiently vigorous mixing to avoid excessive local concentrations of metal ions in the mixture. Alternatively, the colloidal inorganic compound can be formed in a solution of a polymeric polyelectrolyte by an oxidation or reduction reaction, by altering the pH of a suitable metal salt solution or by ion exchange with a chelated metal ion. In order to illustrate the latter, one could, for instance, prepare a first solution of 18.3 mls. of lactic acid in 30 mls. of 5N NaOH. To two parts of this solution is then added one part of 25% $Al_2(SO_4)_3$. 9μl. of this solution, then, when added to 50 ml. of a 1000 ppm. solution of polyacrylamide results in the dispersion of the instant invention.

In practice, the compositions are generally produced by first preparing (by known methods) a dilute solution of one of the organic polymeric polyelectrolytes in water or in a suitable inert salt solution and adding thereto a precipitant, such as hydrogen sulfide or sodium sulfide. To the resulting solution a dilute solution of a salt of a metal precipitatible by said precipitant is added gradually with stirring to form the colloidal, water-insoluble inorganic compound in the presence of the polymeric polyelectrolyte. Thus, for example, a high molecular weight, water-soluble polyacrylamide or hydrolyzed polyacrylamide is dissolved in aqueous 3 percent sodium chloride brine to produce a solution containing at least about 0.005 percent by weight, and preferably from about 0.01 to about 0.50 percent by weight, of polymer and sufficient sodium sulfide is dissolved in the resulting solution to provide from about 2 to about 5 parts by weight of sulfide ion per million parts by weight of solution. To the sulfide-containing polymer solution there is added dropwise with stirring a dilute aqueous solution, generally containing from about 0.05 to about 0.2 percent by weight of metal ion, of a soluble salt of a metal which forms an insoluble sulfide, as, for example, a salt of iron, copper, nickel, mercury, zinc, cadmium, cobalt, tin or lead, to produce a stable colloidal dispersion of the corresponding insoluble metallic sulfide. Similarly, a small amount of an alkali metal hydroxide or of an alkaline buffer can be dissolved in the polymer solution and thereafter a dilute solution of a suitable metallic salt, such as a soluble salt of aluminum, chromium or zinc, is added to precipitate the corresponding metal hydroxide, such as, respectively, aluminum, chromium or zinc hydroxide, in the form of a stable, colloidal dispersion of the insoluble metal hydroxide. In large scale operations, the polymer solution containing the anionic precipitant can be prepared batchwise or continuously and the metallic salt solution may be pumped into a stream of the polymer solution in a suitable conduit wherein natural or induced turbulence provides for proper mixing to generate the desired colloidal dispersion of insoluble, inorganic compound in the flowing stream of polymer solution. In this manner, the colloidal dispersion can be formed in situ immediately before utilizing same on the dam or canal face, or before introduction into the body of water itself.

In certain cases it is convenient to prepare compositions of the invention wherein the colloidal inorganic compound is generated in the presence of the polymer by more complex reactions, such as oxidation or reduction. For example, it has been found that compositions embodying chromic hydroxide are conveniently prepared by adjusting the pH of a suitable solution of polymeric polyelectrolyte to a value in the range of 6.5 to 8.5, and adding an alkali metal chromate to the solution followed by a strong reducing agent such as sodium hydrosulfite to generate chromic ions in situ, which then form the desired colloidal chromic hydroxide sol. Alternatively, hydroxide precipitates can be formed by first adjusting the pH of the polymer solution to a low value, then dissolving a small quantity of a soluble salt of the metal to be precipitated in said solution and thereafter adjusting the pH upward until the desired metal hydroxide separates as a colloidal dispersion composition. The same effect can be obtained by dissolving an amphoteric metal to be precipitated in the solution at a high enough pH to keep it in solution, and thereafter reducing the pH until the desired metal hydroxide separates as a colloidal dispersion composition. When the water used for diluting the solution is sufficiently buffered, it can be used to adjust the pH to cause the metallic hydroxide to precipitate from either the original acid or basic solution.

The concentrations of ingredients in the colloidal dispersion compositions may vary depending upon the degree of fluidity desired and the permeability and porosity of the formation to be treated. In general, the compositions should contain at least about 0.001 percent by weight of at least one organic polymeric polyelectrolyte and may contain up to an amount of such polymer which precludes proper mixing of other ingredients by reason of the viscosity of the polymer solution. Preferably, the compositions contain from about 0.01 to about 1.0 percent by weight of the polymeric polyelectrolyte. Any suitable amount of the colloidal, water-insoluble, inorganic compound can be employed provided such amount is sufficient to reduce or stop flow of water into the permeable formation. In general, such finished compositions will contain at least about 0.05 part by weight, and preferably from about 1 part to about 80 parts by weight, of colloidal, water-insoluble, inorganic compound per million parts by weight of finished dispersion composition. The concentration of inorganic compounds in the finished composition is, of course, only a minor proportion of the concentration of the polymer therein.

SPECIFIC EMBODIMENTS

EXAMPLE 1

The level of a water-storage pond behind an earthen dam in California has been dropping at an excessive rate due to leaks near the base of the dam. An aqueous solution containing 500 parts by weight of an acrylamide polymer per million parts of solution is prepared in 0.3 percent sodium chloride brine. The polymer is a polyacrylamide having about 20 percent of the carboxamide groups hydrolyzed to carboxylate groups and is characterized by a viscosity of about 19 centipoises for a 0.5 percent by weight solution thereof in water at a temperature of 25°C. The polymer solution is pumped to the upstream face of the dam and, just before application, sufficient chromic chloride solution is mixed with the polymer solution to provide 20 parts by weight of chromic ion per million parts of polymer solution to form a colloid complex with the polymer. The resulting colloid complex composition is flowed down the upstream face of the dam in the areas where the leaks originate so that the flow of water will carry the metal-polymer complex composition into the permeable formation in the dam base. The following day it is found that leakage through the dam has essentially ceased.

EXAMPLE 2

The level of a water-storage pond in California had been dropping at an excessive rate due to leaks. An aqueous solution containing 1,000 parts by weight of an acrylamide polymer per million parts of solution is prepared in pond water. The solution is pumped through a 2 ½ inch hose to a storage tank on shore. Just before entering the tank, a solution of sodium aluminate is added. The pH of the resulting mixture is about 9.5, which is sufficient to keep the sodium aluminate in solution. The final concentration of sodium aluminate is such that the resulting solution contains 5 to 10 parts by weight of aluminum ion per million parts of solution. The solution flows out of the tank through a hose. Immediately after leaving the tank, an aqueous 12% solution of ammonium sulfate is added in such an amount to reduce the pH to 8.2. This causes hydrous aluminum hydroxide to precipitate and coacervate with the dissolved polymer to form the composition of this invention. The solution is then pumped through a hose into a large mixing venturi made out of 4 inch diameter pipe. The venturi is submersed in the pond, its purpose being to mix sufficient pond water into the stream of composition to dilute the polymer concentration to 250 ppm or lower. The venturi is properly anchored horizontally near the side of the lake so that its force encourages the entire mass of water in the pond to circulate. A motor boat was also anchored to shore in such a position that the motor helped the entire lake to circulate. The solution at 250 ppm is dilute enough so that it distributes easily into the total mass of water in the pond. The permeable formations through the pond bottom are thus exposed to the polymer-metal ion complex. The leakage rate gradually decreases as this complex enters the flow passages and plugs them.

I claim:

1. The method for plugging leaks in permeable zones of earthen dams, canals, ponds, settling basins and lakes comprising contacting said zone with a stable colloidal dispersion of a water-soluble, inorganic solid formed in an aqueous solution of a water-soluble, synthetic organic polymeric polyelectrolyte by placing said dispersion in a position to be carried into said permeable zone by the natural flow of water through same.

2. A method according to claim 1 wherein the polymeric polyelectrolyte is employed at a concentration of at least about 0.001 percent by weight of the total composition.

3. A method according to claim 2 wherein said concentration is from about 0.01 to about 1.0 percent by weight.

4. A method according to claim 1 wherein the inorganic solid is employed at a concentration of at least about 0.05 part by weight per million parts of total composition.

5. A method according to claim 1 wherein the inorganic solid is a metal sulfide, said metal being iron, copper, nickel, mercury, zinc, cadmium, cobalt, tin or lead; or a metal hydroxide, said metal being aluminum, chromium, iron, cadmium, cobalt, manganese, nickel, copper, tin or zinc.

6. A method according to claim 1 wherein the polymeric electrolyte is polyacrylamide or a hydrolyzed polyacrylamide.

7. A method according to claim 1 wherein the polymeric electrolyte is polyacrylamide or a hydrolyzed polyacrylamide and the inorganic solid is a sulfide of iron, copper, nickel, mercury, zinc, cadmium, cobalt, tin or lead, or a hydroxide of aluminum, chromium, iron, cadmium, cobalt, manganese, nickel, copper, tin or zinc.

8. A method according to claim 7 wherein the inorganic solid is aluminum or zinc hydroxide.

9. A method according to claim 1 wherein the colloidal dispersion is emplaced along the upstream face of an earthen dam and injected into porous passages in said dam by the pressure of the water entering said passages.

10. A method according to claim 1 wherein the colloidal dispersion is placed directly into the body of water, whereby it is carried into the porous formation with the water escaping through same.

* * * * *